US009828522B2

(12) United States Patent
Argyropoulos et al.

(10) Patent No.: US 9,828,522 B2
(45) Date of Patent: Nov. 28, 2017

(54) POLYESTE COMPOSITION AND METHOD OF PRODUCING THE SAME

(71) Applicants: Dow Global Technologies LLC, Midland, MI (US); Eastman Chemical Company, Kingsport, TN (US)

(72) Inventors: John N. Argyropoulos, Midland, MI (US); Gary E. Spilman, Midland, MI (US); Cynthia Stants, Coleman, MI (US); Bernhard Kainz, Lauf (DE)

(73) Assignees: Dow Global Technologies LLC, Midland, MI (US); Eastman Chemical Company, Kingsport, TN (US)

( * ) Notice: Subject to any disclaimer, the term of this patent is extended or adjusted under 35 U.S.C. 154(b) by 0 days.

(21) Appl. No.: 14/391,181

(22) PCT Filed: Apr. 18, 2013

(86) PCT No.: PCT/US2013/037132
§ 371 (c)(1),
(2) Date: Oct. 8, 2014

(87) PCT Pub. No.: WO2013/169459
PCT Pub. Date: Nov. 14, 2013

(65) Prior Publication Data
US 2015/0099837 A1    Apr. 9, 2015

Related U.S. Application Data

(60) Provisional application No. 61/644,764, filed on May 9, 2012.

(51) Int. Cl.
| | | |
|---|---|---|
| *C08G 63/60* | (2006.01) | |
| *C08L 67/02* | (2006.01) | |
| *C08G 59/00* | (2006.01) | |
| *C09D 167/02* | (2006.01) | |
| *C08G 63/199* | (2006.01) | |

(52) U.S. Cl.
CPC ......... *C09D 167/02* (2013.01); *C08G 63/199* (2013.01)

(58) Field of Classification Search
None
See application file for complete search history.

(56) References Cited

U.S. PATENT DOCUMENTS

| | | | |
|---|---|---|---|
| 3,546,008 A | 12/1970 | Shields et al. | |
| 3,734,874 A | 5/1973 | Kibler et al. | |
| 3,779,993 A | 12/1973 | Kibler et al. | |
| 4,233,196 A | 11/1980 | Sublett | |
| 4,340,519 A | 7/1982 | Kotera et al. | |
| 5,596,037 A | 1/1997 | Moens et al. | |
| 5,739,215 A * | 4/1998 | Westerhof et al. | 525/438 |
| 2003/0232958 A1 | 12/2003 | Brunelle et al. | |
| 2010/0204363 A1 | 8/2010 | Marsh et al. | |
| 2010/0204392 A1 * | 8/2010 | Marsh et al. | 524/539 |
| 2013/0023604 A1 * | 1/2013 | Kuo et al. | 523/435 |

FOREIGN PATENT DOCUMENTS

| | | |
|---|---|---|
| WO | WO2008/140705 | 11/2008 |
| WO | WO2010/090714 A1 | 8/2010 |
| WO | WO2013/012556 | 1/2013 |

OTHER PUBLICATIONS

PCT Search Report dated Oct. 18, 2013; from PCT Application No. PCT/US2013/037132.
PCT IPRP dated Nov. 11, 2014; from PCT Application No. PCT/US2013/037132.
Eastman Chemical Company; "2,2,4,4-Tetramethyl-1,3-Cyclobutanediol (TMCD) in Coating Applications," IP Com Journal, IP Com. Inc. W. Henrietta, NY, Aug. 12, 2010 (14 pgs).
Data Base WIP Week 199748; No. XP-002714396; Thomas Scientific, London, GB (AN 1997-522062); Sep. 22, 1997.
Data Base WIP Week 200156; No. XP-002714394; Thomas Scientific, London, GB (AN 2001505206); Apr. 17, 2001.
Data Base WIP Week 200437; No. XP-002714395; Thomas Scientific, London, GB (AN 2004-394119); Mar. 18, 2004.
EPO Office Action dated Feb. 13, 2015 for counterpart EPO Application No. 13720651.2, 2 pages.
Chinese Office Action dated Jan. 19, 2016; from Chinese counterpart Application No. 201380024249.X.
Response to EP Office Action dated Aug. 6, 2015; from EP counterpart Application No. 13720651.2.
Chinese Third Office Action received Oct. 10, 2016; from Chinese counterpart Application No. 201380024249.X.
Chinese Final Office Action received Mar. 10, 2017; from counterpart Chinese Application No. 201380024249.X.
Japanese Office Action received Mar. 21, 2017; from counterpart Japanese Application No. 2015-511492.
Japanese Office Action received Dec. 19, 2016; from counterpart Japanese Application No. 2015-511492.
Chinese Office Action dated Jun. 27, 2016; from Chinese counterpart Application No. 201380024249.X.
Chinese Response to Office Action received Sep. 30, 2016; from Chinese counterpart Application No. 201380024249.X.

* cited by examiner

*Primary Examiner* — Robert T Butcher

(57) ABSTRACT

The instant invention provides a polyester composition, method of producing the same, coating compositions made therefrom, and coating layers made from such coatings. The thermoset polyester composition according to the present inventions comprises the reaction product of: (a) one or more polyacids comprising at least 50 percent by the combined weight of one or more aromatic diacids; and (b) one or more polyols comprising at least 40 percent by the combined weight of 1,4-cyclohexanedimethanol and 2,2,4,4-tetramethylcyclobutanediol; wherein said polyester composition has a glass transition temperature in the range of from 70 to 125° C., a number average molecular weight between 6,000 and 20,000, a hydroxyl number in the range of from 4 to 18.

7 Claims, No Drawings

POLYESTE COMPOSITION AND METHOD OF PRODUCING THE SAME

FIELD OF INVENTION

The instant invention relates to a polyester composition, method of producing the same, coating compositions made therefrom, and coating layers made from such coatings.

BACKGROUND OF THE INVENTION

Coating compositions can be applied to the interior of food and/or beverage metal cans to prevent the contents from contacting the metal surface of the container. Contact with the container contents can lead to corrosion of the metal container and contamination of the packaged product. Epoxy coatings are typically utilized for metal containers due to their superior performance; however, recently, there has been a desire of the food packaging value chain to explore alternative coating technologies with improved properties for a next generation coating. Polyester resin based systems have been used for many years in some packaging coating applications. However, it has been problematic to formulate polyester systems which exhibit the appropriate balance of properties such as flexibility, chemical and corrosion resistance, and adhesion. This present addresses the shortcomings of polyester resins by defining compositions that exhibit a superior balance of properties for packaging coatings.

SUMMARY OF THE INVENTION

The instant invention provides a polyester composition, method of producing the same, coating compositions made therefrom, and coating layers made from such coatings.

In one embodiment, the instant invention provides a polyester composition comprising the reaction product of: (a) one or more polyacids comprising at least 50 percent by the combined weight of one or more aromatic diacids; and (b) one or more polyols comprising at least 40 percent by the combined weight of 1,4-cyclohexanedimethanol and 2,2,4,4-tetramethylcyclobutanediol; wherein said polyester composition has a glass transition temperature in the range of from 70 to 125° C., a number average molecular weight between 6,000 and 20,000 daltons, a hydroxyl number in the range of from 4 to 18 mgKOH/g.

In an alternative embodiment, the instant invention further provides a method for producing a polyester composition comprising: (1) selecting one or more polyacids comprising at least 50 percent by the combined weight of one or more aromatic diacids; (2) selecting one or more polyols comprising at least 40 percent by the combined weight of 1,4-cyclohexanedimethanol and 2,2,4,4-tetramethylcyclobutanediol; (3) contacting said one or more polyacids and one or more polyols in the presence of heat; and (4) thereby forming said polyester composition; wherein said polyester composition has a glass transition temperature in the range of from 70 to 125° C., a number average molecular weight between 6,000 and 20,000, a hydroxyl number in the range of from 4 to 18.

In another alternative embodiment, the instant invention further provides a coating composition comprising the above-described polyester composition and one or more crosslinking agents.

In another alternative embodiment the instant invention further provides a powder formulation derived from the above-described polyester and crosslinker composition for use in powder coatings.

In another alternative embodiment, the instant invention further provides an aqueous dispersion comprising the above-described polyester composition. In another alternative embodiment, the instant invention further provides a solution mixture comprising the above-described polyester composition and one or more solvents.

In another alternative embodiment, the instant invention further provides a coating layer derived from the any of the above-described coating compositions.

In another alternative embodiment, the instant invention further provides a coated substrate comprising a substrate and any one of the above-described coating compositions associated with at least one surface of said substrate.

In an alternative embodiment, the instant invention provides a polyester composition, method of producing the same, coating compositions made therefrom, and coating layers made from such coatings, in accordance with any of the preceding embodiments, except that [describe].

DETAILED DESCRIPTION OF THE INVENTION

The instant invention provides a polyester composition, method of producing the same, coating compositions made therefrom, and coating layers made from such coatings.

In one embodiment, the instant invention provides a polyester composition comprising the reaction product of: (a) one or more polyacids comprising at least 50 percent by the combined weight of one or more aromatic diacids; and (b) one or more polyols comprising at least 40 percent by the combined weight of 1,4-cyclohexanedimethanol and 2,2,4,4-tetramethylcyclobutanediol; wherein said polyester composition has a glass transition temperature in the range of from 70 to 125° C., a number average molecular weight between 6,000 and 20,000 daltons, a hydroxyl number in the range of from 4 to 18 mgKOH/g.

One or More Polyacids

The one or more polyacids comprise at least 50, for example, from 60 to 100; or in the alternative, from 70 to 100; or in the alternative, from 80 to 100, percent by the combined weight of one or more aromatic dicarboxylic acids (diacids). Suitable aromatic dicarboxylic acids include, but are not limited to, those having up to about 20 carbon atoms, including, but not limited to, terephthalic acid, phthalic acid, isophthalic acid, phthalic anhydride, 5-tert butyl isophthalic acid, chlorendic acid, trimellitic anhydride, 4,4'-biphenyldicarboxylic acid, 1,4-, 1,5-, 2,6-, 2,7-naphthalenedicarboxylic acid, and trans-4,4'-stilbenedicarboxylic acid, and the esters thereof. The one or more polyacids may also comprise one or more saturated as well as unsaturated aliphatic or cycloaliphatic dicarboxylic acids such as, for example, but not limited to, maleic acid, maleic anhydride, malonic acid, fumaric acid, succinic acid, succinic anhydride, glutaric acid, adipic acid, 2-methyl-1,6-hexanoic acid, pimelic acid, suberic acid, dodecanedioic acids, tetrahydrophthalic anhydride, hexahydrophthalic acid, hexahydrophthalic anhydride, endomethylenetetrahydrophthalic anhydride, azelaic acid, fumaric acid, sebacic acid, tetrachlorophthalic anhydride, cyclohexane-dicarboxylic acid, and mixtures thereof.

One or More Polyols

The one or more polyols comprise one or more diol components, wherein the one or more diol components are cycloaliphatic diols comprising at least 40, for example, at least 50; or at least from 50 to 95; or in the alternative, from 60 to 90; or in the alternative, from 70 to 90; or in the alternative, from 80 to 90, percent by the combined weight of 1,4-cyclohexanedimethanol and 2,2,4,4-tetramethylcyclobutanediol. The one or more polyols may further comprise include one or more selected from the group consisting of 1,2-cyclohexanedimethanol, 1,3-cyclohexanedimethanol, 1,2-cyclohexane diol, 1,3-cyclohexane diol, 1,4-cyclohexane diol, 1,2-propanediol, neopentyl glycol, 1,3-propanediol, polyethylene glycols, polytetramethylene glycols, p-xylene glycol, diethylene glycol, triethylene glycol, dipropylene glycol, tripropylene glycol and higher polypropylene glycols, butanediols, 1,5-pentanediol and other pentane diols, hexanediols, decanediols, and dodecanediols, glycerol, trimethylolpropane, trimethylolethane, dipentaerythritol, 1,3-butylene-ethylpropanediol, 2-methyl-1,3-propanediol, 1,4-benzyldimethanol, 2,4-dimethyl-2-ethylhexane-1,3-diol, isopropylidene bis(p-phenylene-oxypropanol-2), 2-butyl-2-ethyl-1,3-propanediol, and mixtures thereof.

Polyester Composition

The inventive polyester composition has a glass transition temperature in the range of from 70 to 125° C., for example, from 75 to 125° C.; or in the alternative, from 85 to 125° C.; or in the alternative, from 90 to 120° C. The polyester composition has a number average molecular weight between 6,000 and 20,000, for example, from 8,000 to 20,000; or in the alternative, from 8,000 to 18,000; or in the alternative, from 8,000 to 15,000 daltons. The polyester composition has a hydroxyl number in the range of from 4 to 18, for example, from 5 to 18, or in the alternative, from 7 to 15 mgKOH/g.

In the process for producing the polyester composition, one or more polyacids comprising at least 50 percent by the combined weight of one or more aromatic diacids and one or more polyols comprising at least 40 percent by the combined weight of 1,4-cyclohexanedimethanol and 2,2,4,4-tetramethylcyclobutanediol are brought into contact with each other in the presence of heat; thus, forming the inventive polyester composition, wherein said polyester composition has a glass transition temperature in the range of from 70 to 125° C., a number average molecular weight between 6,000 and 20,000 daltons, a hydroxyl number in the range of from 4 to 18 mgKOH/g. The polycondensation step can be accomplished via any conventional methods generally known to a person of ordinary skill in the art.

The inventive polyester composition may be produced by conventional polycondensation techniques such as for example described in Zeno W. Wicks, Jr, Frank N. Jones, S. Peter. Pappas "Organic Coatings, Science and Technology," pp 246-257 (John Wiley & Sons, 1999, second edition) and references therein or in Houben-Weyl, "Methoden der Organischen Chemie, Band E20, Makromolekulare Soffe, Polyester" pp 1405-1429. (Georg Thieme Verlag, Stuttgart 1987) and references therein. In one embodiment, a diol or polyol and a di-carboxylic acid or polycarboxylic acid components are charged into a conventional polymerization vessel and reacted between about 150° C. and 280° C. for several hours. Optionally, an esterification catalyst may be used to decrease the reaction time. It may be preferable to use a two-step process to provide an OH functional polyester. In one embodiment, carboxyl-functional polyester is first prepared which then in a subsequent step is reacted with a polyol such as a diol to form a polyester with hydroxyl functionality.

Solution Mixtures

The inventive polyester composition of the present invention may be formulated into one or more solution mixtures. Such solution mixtures comprise one or more inventive polyester compositions and one or more solvents. Such solvents include, but are not limited to, hydrocarbon solvents such as toluene, xylene, hexane, heptane, ethylbenzene, Aromatic 100 (available from ExxonMobil Chemical Company), Aromatic 150 (available from ExxonMobil Chemical Company) white spirits and/or mixtures thereof; oxygenated solvents such as alkyl esters, ketones, glycols, glycol ethers, 2,2,4-trimethyl-1,3-pentanediol monoisobutyrate, alcohols, glycol ether esters, mineral spirits, and/or combinations thereof. Such solution mixtures may comprise from 25 to 80 percent by weight of one or more solvents, based on the weight of the solution mixtures. Such solution mixtures may comprise 20 to 75 percent by weight of one or more polyester compositions, based on the weight of the solution mixtures. The one or more solution mixtures may be formulated into one or more coating compositions, as described below.

Aqueous Dispersions

The inventive polyester composition of the present invention may be formulated into one or more aqueous dispersions. Such aqueous dispersions may comprise the melt kneading product of one or more inventive polyester compositions and one or more stabilizing agents in the presence of water and optionally one or more neutralizing agents. In an alternative embodiment, the inventive polyester composition may be formulated into a dispersion without the need for a melt kneading device, provided however, that the inventive polyester composition is modified into a self-dispersing polyester composition, as described herein. The one or more aqueous dispersions may be formulated into one or more coating compositions, as described above.

The aqueous dispersion comprises from 10 to 75 percent by weight of solid content based on the weight of the dispersion, for example, from 35 to 75; or in the alternative, from 35 to 65.

The aqueous dispersion comprises from 50 to 99 percent by weight of one or more inventive polyester compositions, based on the total weight of the solid content of the aqueous dispersion.

The aqueous dispersion may contain solvents as well as co-solvents in the fluid medium.

In another embodiment, the inventive polyester composition may be modified to form polyester acrylates that are self-dispersible via in-situ polymerization of copolymerizable ethylenically unsaturated monomers in presence of the inventive polyester composition. Examples include ethylenically unsaturated mono- or polyfunctional acids, ethylenically unsaturated mono- or polyfunctional acid esters, amides, nitriles as well as vinyl monomers and vinyl ester with a polyester in or without presence of a reaction fluid according to suitable methods known to those of ordinary skill in the art.

In another embodiment the inventive polyester composition may be modified by reaction with an epoxy resin to form a polyester epoxy resin block hybrid copolymer. Suitable epoxy resins for producing stabilizing agents may be obtained in accordance with conventional procedures well known to those of ordinary skill in the art by reacting a polyepoxide with a suitable polynucleophile. Suitable epoxides include, but are not limited to, glycidyl ethers, and other epoxy group containing molecules. Suitable polynucleophiles include, but are not limited to, polyhydric phenols, and poly phenols, polythiols, aliphatic polyalcohols or polybasic acids or polyamines Exemplary suitable epoxies, for example, include, but are not limited to, glycidyl ether that contains at least two glycidyl ether groups per polyglycidyl ether molecule (e.g. an at least diglycidyl ether) with a polyhydric phenol that contains at least two hydroxyl groups in the polyhydric polyphenol (e.g., at least dihydric phenol or a diphenol) in presence of a conventional catalyst at an elevated temperature with or without solvent present. Another class of epoxy resins may be obtained in accordance with conventional procedures well known to those of ordinary skill in the art by reacting, for example, a polyglycidyl ether that contains at least two glycidyl ether groups per polyglycidyl ether molecule (e.g. an at least diglycidyl ether) with a polybasic acid that contains at least two carboxyl groups per polybasic acid molecule (e.g. an at least dibasic polycarboxylic acid) in presence of a conventional catalyst at an elevated temperature with or without solvent present. The resulting polyester epoxy blockcopolymers could also be modified by reaction with acrylic monomers to form water dispersible polymers according to suitable methods known to those of ordinary skill in the art.

Stabilizing Agent Component of the Aqueous Dispersion

The aqueous dispersion may comprise at least one or more stabilizing agents comprising to promote the formation of a stable dispersion. The aqueous dispersion comprises up to 100 percent by weight of one or more stabilizing agents, based on the total weight of the solid content of the dispersion. All individual values and subranges from 1 to 100 weight percent are included herein and disclosed herein; for example, the weight percent can be from a lower limit of 1, 3, 5, 10 weight percent to an upper limit of 15, 25, 35, 45, 50, 75, 85, 95, or 100 weight percent. For example, the dispersion may comprise from 1 to 25; or in the alternative, from 1 to 35; or in the alternative, from 1 to 40; or in the alternative, from 1 to 45; or in the alternative, from 1 to 65; or in the alternative, from 1 to 75; or in the alternative, from 1 to 85; or in the alternative, from 1 to 100, percent by weight of one or more stabilizing agents, based on the total weight of the solid content of the dispersion. In one embodiment, the inventive polyester composition is self-dispersible; thus, the aqueous dispersion may comprise up to 100 percent by weight of the self-dispersible polyester composition, which may also act as a stabilizing agent, based on the total weight of the solid content of the dispersion. When the inventive polyester is not self-dispersible, the aqueous dispersion comprises less than 50 percent by weight of one or more stabilizing agents, based on the total weight of the solid content of the dispersion.

In one embodiment, the stabilizing agent is a second polyester (i) having a carboxylic acid group and an acid number equal to or greater than 15, for example equal or greater than 20, based on the solid content of the second polyester; or (ii) capable of being a self-dispersing sulfopolyester.

Such second polyesters may be the inventive polyester composition as described above with the provision that the inventive polyester composition (i) has a carboxylic acid group and an acid number equal to or greater than 15, for example equal or greater than 20, based on the solid content of the inventive polyester composition; or (ii) capable of being a self-dispersing.

The carboxylated second polyester is a high acid, water dispersible, hydrophilic polyester, which is used as the primary stabilizing agent for dispersing the inventive polyester composition. The carboxylated second polyester typically has an acid number in the range of from greater than or equal to 15 mg KOH/g (based on resin solids), for example from 20 to 80 mg KOH/g (based on resin solids). The high acid stabilizing polyester may also have hydroxyl functionality, but this is not required. Preferably the high acid stabilizing polyester has an OH number of at least 2 mg KOH/g (based on resin solids), preferably 5 mg KOH/g or greater, and most preferably 20 mg KOH/g or greater. The high acid stabilizing polyester may be produced by conventional polycondensation techniques such as for example described in Zeno W. Wicks, Jr, Frank N. Jones, S. Peter. Pappas "Organic Coatings, Science and Technology," pp 246-257 (John Wiley & Sons, 1999, second edition) and references therein or in Houben-Weyl, "Methoden der Organischen Chemie, Band E20, Makromolekulare Soffe, Polyester" pp 1405-1429. (Georg Thieme Verlag, Stuttgart 1987) and references therein. In one embodiment, a diol or polyol and a di-carboxylic acid or polycarboxylic acid are charged into a conventional polymerization vessel and reacted between about 150° C. and 280° C. for several hours. Optionally, an esterification catalyst may be used to decrease the reaction time. It may be preferable to use a two-step process to provide a carboxyl functional polyester. In one embodiment, an OH-functional polyester is first prepared so that there is little, if any, free carboxylic acid and/or carboxylate functions, and which then in a subsequent step is reacted with a cyclic dicarboxylic anhydride, in a ring-opening and monoester-forming reaction, with free carboxylic acid and/or carboxylate groups then being formed. The excess of OH functionality in the resin of the first step is designed in such a way that the final resin, after the reaction with the polyacid functional molecules, will provide a carboxyl terminated polyester resin in which the acid number is typically in the range of from equal to or greater than 15 mg KOH/g (based on resin solids), for example from 20 to 80 mg KOH/g (based on resin solids).

The carboxylic acid component of the high acid stabilizing polyester may contain one or more aliphatic, cycloaliphatic, araliphatic, and/or aromatic carboxylic acids with a COOH functionality of at least two, or anhydrides thereof. Suitable and typical dicarboxylic acids or polycarboxylic acids, or their corresponding alkyl esters, that may be used to form the high acid stabilizing polyester include, but are not limited to, saturated as well as unsaturated dicarboxylic acids such as, for example, but not limited to, maleic acid, maleic anhydride, malonic acid, fumaric acid, succinic acid, succinic anhydride, glutaric acid, adipic acid, 2-methyl-1,6-hexanoic acid, pimelic acid, suberic acid, dodecanedioic acids, phthalic acid, phthalic anhydride, 5-tert butyl isophthalic acid, tetrahydrophthalic anhydride, hexahydrophthalic acid, hexahydrophthalic anhydride, endomethylenetetrahydrophthalic anhydride, azelaic acid, fumaric acid, sebacic acid, tetrachlorophthalic anhydride, chlorendic acid, isophthalic acid, trimellitic anhydride, terephthalic acid, naphthalene dicarboxylic acid, cyclohexane-dicarboxylic acid, and mixtures thereof.

The glycol component of the high acid stabilizing polyester may be ethylene glycol, diethylene glycol, triethylene glycol and/or higher polyethylene glycols, propylene glycol, dipropylene glycol, tripropylene glycol and/or higher polypropylene glycols, 1,3-propanediol, 1,4-butanediol and other butanediols, 1,5-pentanediol and/or other pentane diols, hexanediols, cyclohexane diols, decanediols, and/or dodecanediols, glycerol, trimethylolpropane, trimethylolethane, neopentyl glycol, pentaerythritol, cyclohexanedimethanol, a polyethylene or polypropylene glycol having a molecular weight of about 500 or less, dipentaerythtritol, 1,3-butyleethylpropanediol, 2-methyl-1,3-propanediol, 1,4-benzyldimethanol, 2,4-dimethyl-2-ethylhexane-1,3-diol, isopropylidene bis(p-phenylene-oxypropanol-2), and mixtures thereof. In some embodiments, the aliphatic glycol may contain from 2 to 8 carbon atoms 1,3-cyclohexanedimethanol, 1,4-cyclohexanedimethanol (or mixtures of 1,3 and 1,4 cyclohexanedimethanol, may be cis or trans), 2,2, 4,4-tetramethyl-1,3-cyclobutanediol (may be cis, trans, or a mixture thereof) 4,4'-dihydroxy-2,2'-diphenylpropane or mixtures thereof.

In another embodiment the stabilizing agent is a second polyester comprising a sulfopolyester that disperses directly in hot water without the assistance of neutralizing agents. The sulfopolyester consists essentially of (a) a dicarboxylic acid component comprising one or more sulfo monomers. Suitable sulfo monomers include, but are not limited to dimethyl-5-sodiosulfoisophthalate, and 5-sodiosulfoisophthalic acid. The dicarboxylic acid component typically also contains one or more conventional dicarboxylic acids used in the preparation of polyesters, including but not limited to, for example, isophthalic acid (b) a diol component consisting of one or more diols typically used in the manufacture of polyesters, including, but not limited to diethylene glycol, 1,4-cyclohexanedimethanol (cis or trans), 1,3-cyclohexanedimethanol (cis or trans), and mixtures thereof. The sulfo polyester will typically have a glass transition temperature (Tg) of between 20-60° C.

The useful sulfopolyesters in this invention are described in U.S. Pat. No. 3,546,008; U.S. Pat. No. 4,340,519; U.S. Pat. No. 3,734,874; U.S. Pat. No. 3,779,993; and U.S. Pat. No. 4,233,196 incorporated herein by reference to the extent that such sulfopolyesters disclosed. Useful sulfopolyesters are available from Eastman Chemical, such as, for example, Eastman AQ29, Eastman AQ38, and Eastman AQ55. Such suitable sulfopolyester are typically pre-neutralized.

The composition of the stabilizing agent (second polyester) must be chosen so that it exhibits good compatibility with the inventive polyester composition.

In selected embodiments, the stabilizing agent comprises a surfactant. Other stabilizing agents that may be used include, but are not limited to, long chain fatty acids, fatty acid salts, or fatty acid alkyl esters having from 12 to 60 carbon atoms. In other embodiments, the long chain fatty acid or fatty acid salt may have from 12 to 40 carbon atoms.

Additional stabilizing agents that may be useful in the practice of the present invention include, but are not limited to, cationic surfactants, anionic surfactants, or non-ionic surfactants. Examples of anionic surfactants include, but are not limited to, sulfonates, carboxylates, and phosphates. Examples of cationic surfactants include, but are not limited to, quaternary amines Examples of non-ionic surfactants include, but are not limited to, block copolymers containing ethylene oxide and silicone surfactants. Stabilizing agents useful in the practice of the present invention can be either external surfactants or internal surfactants. External surfactants are surfactants that do not become chemically reacted into the base polymer during dispersion preparation. Examples of external surfactants useful herein include, but are not limited to, salts of dodecyl benzene sulfonic acid and lauryl sulfonic acid salt. Internal surfactants are surfactants that do become chemically reacted into the base polymer during dispersion preparation. An example of an internal surfactant useful herein includes 2,2-dimethylol propionic acid and its salts. YMER N-120 is an exemplary commercially available internal surfactant from Perstorp. Additional surfactants that may be useful in the practice of the present invention include cationic surfactants, anionic surfactants, non-ionic surfactants, or combinations thereof. Various commercially available surfactants may be used in embodiments disclosed herein, including: OP-100 (a sodium stearate), OPK-1000 (a potassium stearate), and OPK-181 (a potassium oleate), each available from RTD Hallstar; UNI-CID 350, available from Baker Petrolite; DISPONIL FES 77-IS, DISPONIL TA-430, Disponil FES-32, and Diponil FES-993, each available from Cognis; RHODAPEX CO-436, SOPROPHOR 4D384, 3D-33, and 796/P, RHODACAL BX-78 and LDS-22, RHODAFAC RE-610, and RM-710, and SUPRAGIL MNS/90, each available from Rhodia; and TRITON QS-15, TRITON W-30, DOWFAX 2A1, DOWFAX 3B2, DOWFAX 8390, DOWFAX C6L, TRITON X-200, TRITON XN-45S, TRITON H-55, TRITON GR-5M, TRITON BG-10, and TRITON CG-110, each available from The Dow Chemical Company, Midland, Mich. and ESPERSE grades E-100, E-506, E-328, E-355, and E-600, each available from Ethox Chemicals, LLC.

Additional stabilizing agents which could be used are solution or suspension polymers consisting of ethylenically unsaturated monomers such as acrylic and/or methacrylic acid and their ($C_1$-$C_{30}$) esters or amides; acrylamide/methacrylamide and their N-substituted derivatives; acrylonitrile; styrene and substituted styrene derivatives.

Exemplary polymeric stabilizing agents include, but are not limited to, amphiphilic copolymer compositions, the copolymer comprising the reaction product of (i) from 5 to 95 wt. % of one or more hydrophilic monomers and (ii) from 5 to 95 wt. % of one or more copolymerizable ethylenically unsaturated hydrophobic monomers. These materials are water soluble or emulsifiable, especially upon neutralization and can act as colloidal stabilizers. Exemplary stabilizing agents, for example, include, but are not limited to, butylacrylate and laurylmethacrylate.

Representative nonionic, water-soluble monomers suitable for production of amphiphilic copolymer compositions, include, but are not limited to, acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, t-butylacrylamide, N methylolacrylamide, alkyl(meth)acrylates such as methyl(meth)acrylate, butyl acrylate and ethylacrylate, vinyl monomers such as ethylene, styrene, divinylbenzene, di-isobutylethylene, vinyl acetate and N-vinyl pyrrolidone, and allyl monomers such as allyl (meth)acrylate.

Representative cationic, water-soluble monomers suitable for production of amphiphilic copolymer compositions include, but are not limited to, quaternary ammonium salts of amine functionalized monomers such as acrylamide, methacrylamide, N,N-dimethylacrylamide, N,N-diethylacrylamide, N-isopropylacrylamide, N-vinylformamide, N-vinylmethylacetamide, N-vinyl pyrrolidone, t-butylacrylamide, N-methylolacrylamide, tributylammonium ethyl (meth)acrylate TBAEMA, DMAEMA, DMAPMAM, diallyldimethylammonium chloride (DADMAC), methylacrylamidopropyltrimethylammonium chloride (MAPTAC), acrylamidopropyltrimethylammonium chloride (APTAC), N-vinyl pyrrolidone, vinylimidazole, polyquaternium-11 and polyquaternium-4.

"Anionic" or "acid-containing monomer" suitable for production of amphiphilic copolymer compositions include, but are not limited to, ethylenically unsaturated monomers containing carboxylic acid, phosphonic acid, phosphinic acid, sulfinic acid and sulfonic acid groups. Suitable examples include (meth)acrylic acid, maleic acid, succinic acid, itaconic acid, vinyl phosphonic acid and vinylsulfonic acid.

In an alternative embodiment, one or more stabilizing agents may be used based on resins such as polyester, epoxy resins, polyamide resins, which might be reacted with acrylic resins or acrylic monomers to form polyester acrylate, polyamide acrylates epoxy resin acrylates.

Polyester acrylates as stabilizing agents may be formed via in-situ polymerization of copolymerizable ethylenically unsaturated monomers in presence of polyesters. Examples include ethylenically unsaturated mono- or polyfunctional acids, ethylenically unsaturated mono- or polyfunctional acid esters, amides, nitriles as well as vinyl monomers and vinyl ester with a polyester in or without presence of a reaction fluid. Polyester acrylates in solvents can be dried according to suitable methods known to those of ordinary skill in the art.

Suitable epoxy resins for producing stabilizing agents may be obtained in accordance with conventional procedures well known to those of ordinary skill in the art by reacting a polyepoxide with a suitable polynucleophile. Suitable epoxides include, but are not limited to, glycidyl ethers, and other epoxy group containing molecules. Suitable polynucleophiles include, but are not limited to, polyhydric phenols, and poly phenols, polythiols, aliphatic polyalcohols or polybasic acids or polyamines Exemplary suitable epoxies, for example, include, but are not limited to, glycidyl ether that contains at least two glycidyl ether groups per polyglycidyl ether molecule (e.g. an at least diglycidyl ether) with a polyhydric phenol that contains at least two hydroxyl groups in the polyhydric polyphenol (e.g., at least dihydric phenol or a diphenol) in presence of a conventional catalyst at an elevated temperature with or without solvent present. Another class of epoxy resins may be obtained in accordance with conventional procedures well known to those of ordinary skill in the art by reacting, for example, a polyglycidyl ether that contains at least two glycidyl ether groups per polyglycidyl ether molecule (e.g. an at least diglycidyl ether) with a polybasic acid that contains at least two carboxyl groups per polybasic acid molecule (e.g. an at least dibasic polycarboxylic acid) in presence of a conventional catalyst at an elevated temperature with or without solvent present.

Epoxy acrylates for producing stabilizing agents may be formed via in-situ polymerization of copolymerizable ethylenically unsaturated monomers in presence of epoxy resins. Examples include, but are not limited to, ethylenically unsaturated mono- or polyfunctional acids, ethylenically unsaturated mono- or polyfunctional acid esters, amides, nitriles as well as vinyl monomers and vinyl ester with an epoxy resins in or without presence of a reaction fluid. Alternatively a polymeric acid functional acrylic resin can be reacted with an epoxy resin in the presence of a suitable catalyst to form epoxy acrylate. Epoxy acrylates in solvents can be dried according to suitable methods known to those of ordinary skill in the art. In one embodiment, the surfactant may comprise the reaction product of an acid functionalized polyester and an epoxy resin.

In one embodiment, the inventive polyester composition may be modified to form polyester acrylates that are self-dispersible via in-situ polymerization of copolymerizable ethylenically unsaturated monomers in presence of the inventive polyester compsoition. Examples include ethylenically unsaturated mono- or polyfunctional acids, ethylenically unsaturated mono- or polyfunctional acid esters, amides, nitriles as well as vinyl monomers and vinyl ester with a polyester in or without presence of a reaction fluid.

Neutralizing Agent

The inventive polyester composition, the stabilizing agent as well modified polyester acrylates and/or polyester epoxy block copolymer acrylates may be partially or fully neutralized with a neutralizing agent. In certain embodiments, neutralization of the stabilizing agent may be from 30 to 250 percent on a molar basis; or in the alternative, it may be from 50 to 200 percent on a molar basis; or in the alternative, it may be from 50 to 150 percent on a molar basis; or in the alternative, it may be from 50 to 120 percent on a molar basis. For example, the neutralizing agent may be a base, such as ammonium hydroxide, sodium hydroxide, or potassium hydroxide. Other neutralizing agents can include lithium hydroxide or sodium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP) Amines useful in embodiments disclosed herein may include diethanolamine, triethanolamine, and TRIS AMINO™ (each available from Angus), NEUTROL™ TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, butylamine, dibutylamine, tributylamine, dimethyl benzyl amine, dimethyl n-propylamine, N-methanol amine, N-aminoethylethanolamine, N-methyldiethanolamine, monoisopropanolamine, N,N-dimethyl propanolamine, 2-amino-2-methyl-1-propanol, 1,2-diaminopropane, tris(hydroxymethyl)-aminomethane, ethylenediamine N,N,N'N'-tetrakis(2-hydroxylpropyl) ethylenediamine, N,N,N',N' tetramethylpropanediamine, 3-methoxypropyl amine, imino bis-propyl amine and the like. In some embodiments, mixtures of amines or mixtures of amines and other surfactants may be used. In one embodiment, the neutralizing agent may be a polymeric amine, e.g. diethylene triamine Those having ordinary skill in the art will appreciate that the selection of an appropriate neutralizing agent depends on the specific composition formulated, and that such a choice is within the knowledge of those of ordinary skill in the art. In one embodiment, amines with boiling points below 250° C. may be used as the neutralizing agents.

Fluid Medium

The aqueous dispersion further comprises a fluid medium. The fluid medium is water. The aqueous dispersion comprises from 25 to 90 percent by weight of water, based on the weight of the dispersion; for example, the dispersion comprises from 25 to 85 percent by weight of water, based on the weight of the dispersion; or in the alternative from 35 to 75 percent by weight of water, based on the weight of the dispersion; or in the alternative from 40 to 75 percent by weight of water, based on the weight of the dispersion; or in the alternative from 40 to 65 percent by weight of water, based on the weight of the dispersion. Water content of the dispersion may preferably be controlled so that the solids content is in the range of from 10 to 75 percent by weight, based on the weight of the dispersion. For example, the dispersion comprises from 20 to 70 percent by weight of solid contents, based on the weight of the dispersion; or in the alternative, from 25 to 70 percent by weight of solid contents, based on the weight of the dispersion; or in the alternative, from 35 to 70 percent by weight of solid contents, based on the weight of the dispersion; or in the alternative, from 35 to 65 percent by weight of solid contents, based on the weight of the dispersion; or in the alternative, from 40 to 70 percent by weight of solid contents, based on the weight of the dispersion; or in the alternative, from 40 to 65 percent by weight of solid contents, based on the weight of the dispersion; or in the alternative, from 45 to 65 percent by weight of solid contents, based on the weight of the dispersion; or in the alternative, from 50 to 70 percent by weight of solid contents, based on the weight of the dispersion.

Forming the Aqueous Dispersion

The aqueous dispersion can be formed by any number of methods recognized by those having skill in the art. Dispersion equipment can be operated in batch, semi-batch, or continuous mode. Examples of mixers include rotor-stator, microfluidizer, high pressure homogenizer, ultrasonic, impinging jet, Cowles™ blade, planetary mixers, and melt kneading devices such as extruders.

In one embodiment, the inventive polyester composition, one or more stabilizing agents are melt-kneaded in an extruder along with water and optionally one or more neutralizing agents, such as ammonia, potassium hydroxide, amine, or a combination of two or more, to form a dispersion. In some embodiments, the dispersion is first diluted to contain from 1 to 20 percent, e.g., 1 to 5 percent or 1 to 3 percent, by weight of water, and then, subsequently, further diluted to comprise from 15 to 90 percent by weight of water, based on the weight of dispersion. In one embodiment, further dilution may be accomplished via a solvent. In one embodiment, the dispersion is free of any solvent.

Any melt-kneading means known in the art may be used. In some embodiments, a kneader, a BANBURY® mixer, single-screw extruder, or a multi-screw extruder, e.g. a twin screw extruder, melt pump in connection with a rotor stator is used. A process for producing the dispersions in accordance with the present invention is not particularly limited. For example, an extruder, in certain embodiments, for example, a twin screw extruder, may be coupled to a back pressure regulator, melt pump, or gear pump. Exemplary embodiments also provide a base reservoir and an initial water reservoir, each of which includes a pump. Desired amounts of base and initial water are provided from the base reservoir and the initial water reservoir, respectively. Any suitable pump may be used. In some embodiments, the base and initial water are preheated in a preheater.

One or more inventive polyester compositions, in the form of, for example, pellets, powder, or flakes, are fed from the feeder to an inlet of the extruder where the resin is melted. One or more additional components may optionally be fed simultaneously with one or more inventive polyester compositions into the extruder via the feeder; or in the alternative, one or more additional components may be compounded into one or more inventive polyester compositions, and then fed into the extruder via the feeder. In the alternative, additional one or more additional components may optionally further be metered via an inlet prior to the emulsification zone into the molten compound comprising one or more inventive polyester compositions. In some embodiments, the stabilizing agent is added to one or more inventive polyester compositions through and along with the one or more inventive polyester compositions and in other embodiments, the stabilizing agent is provided separately to the twin screw extruder. The resin melt is then delivered from the mix and convey zone to an emulsification zone of the extruder where the initial amount of water and base from the water and base reservoirs are added through an inlet. In some embodiments, stabilizing may be added additionally or exclusively to the water stream. In some embodiments, further dilution water may be added via water inlet from water reservoir in a dilution and cooling zone of the extruder. Typically, the dispersion is diluted to at least 30 weight percent water in the cooling zone. In addition, the diluted mixture may be diluted any number of times until the desired dilution level is achieved. In some embodiments, the dispersion is further cooled after exiting the extruder by the use of a suitable heat exchanger. In other embodiments, water is not added into the twin screw extruder but rather to a stream containing the resin melt after the melt has exited from the extruder. In this manner, steam pressure build-up in the extruder is eliminated and the dispersion is formed in a secondary mixing device such as a rotor stator mixer.

In another embodiment, the aqueous dispersion can be formed in a continuous high shear mixer without the use of a melt kneading extruder. In this embodiment, the first stream comprising one or more liquid or molten inventive polyester compositions is supplied to a continuous high shear mixer from a suitable liquid pump for example, a syringe pump, gear pump, or progressive cavity pump. The first stream is flowed through a first conduit and merged continuously with a second stream containing a continuous aqueous phase that is flowed through a second conduit. The first and second streams are merged into a disperser in the presence of a stabilizing agent with optional neutralizing agent. The agents can be added to either the first or second stream, or as a separate stream. A third stream comprising water can be added downstream from the disperser. The flow rates of the streams are adjusted to achieve a dispersion having the desired amount of polymer phase and percent solids. The disperser can be any one of a number of continuous inline mixers, for example, an IKA high-shear mixer, Oakes rotor stator mixer, Ross mixer, Silverson mixer, or centrifugal pump. The rpm setting of the disperser can be used to help control the particle size of the dispersed hydrophobic phase in the dispersion. The system can be heated to provide a suitable viscosity for pumping. Steam formation is reduced by controlling the pressure through the use of a backpressure regulator, gear pump, metering pump, or other suitable device near the exit of the process. In some embodiments, the dispersion is further cooled after exiting the disperser by the use of a suitable heat exchanger.

In another embodiment, the aqueous dispersion can be formed in a batch or semi-batch high shear mixer where the mixer may, for example, be disposed within a pressurized tank to, for example, reduce steam formation. All or at least a portion of the dispersion is removed from the tank during processing, and optionally cooled by the use of a suitable heat exchanger.

Coating Compositions

The polyester composition of the present invention may be formulated into one or more coating compositions. Such coating compositions include the inventive polyester composition or derivatives thereof and one or more cross-linking agents. The coating composition may comprise at least 50 percent by weight of one or more polyester compositions or derivatives thereof, based on the solid content of the coating composition, for example, from 50 to 95 weight percent; or in the alternative, from 60 to 95 weight percent. The coating composition may comprise up to 50 percent by weight of one or more cross-linking agents, based on the solid content of the coating composition, for example, from 5 to 50 weight percent; or in the alternative, from 10 to 40 weight percent. The coating composition can be derived from the aqueous dispersion or solution mixture comprising one or more inventive polyester compositions.

Additional Coating Composition Components

The coating composition of the present invention may optionally be blended with one or more aqueous binder compositions such as acrylic latex, vinyl acrylic latex, styrene acrylic latex, vinyl acetate ethylene latex, epoxy dispersion, polyester dispersion, polyethylene terephthalate copolyester dispersion, polyurethane dispersion, alkyd dispersion, polyolefin dispersion, and combinations thereof; or solvent based acrylic, vinyl acrylic, styrene acrylic, vinyl acetate ethylene, epoxy, polyurethane, polyester, polyethylene terephthalate copolyester, alkyd, polyolefin polymeric compositions, optionally one or more fillers; optionally one or more additives such as catalysts, wetting agents, defoamers, flow agents, release agents, slip agents, anti-blocking agents, additives to mask sulfur staining, pigment wetting/dispersion agents, anti-settling agents, UV stabilizers, adhesion promoters; optionally one or more lubricants such as fatty acid ester wax, silicon-based wax, fluorine-based wax, polyethylene or any other similar polyolefin wax, carnauba wax, lanolin wax or the like; optionally one or more corrosion inhibitors such as aluminum, and zinc: optionally one or more pigments, e.g. titanium dioxide, barium sulfate, mica, calcium carbonate, silica, zinc oxide, milled glass, aluminum trihydrate, talc, antimony trioxide, fly ash, and clay or the like; optionally one or more co-solvents, e.g. glycols, glycol ether, 2,2,4-trimethyl-1,3-pentanediol monoisobutyrate, alcohols, mineral spirits, aromatic solvents and benzoate esters or the like; optionally one or more dispersants, e.g. aminoalcohols, and polycarboxylates; optionally one or more surfactants; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or optionally one or more additional neutralizing agents, e.g. hydroxides, amines, ammonia, and carbonates; optionally one or more solvents or coalescing agents.

In addition, the inventive coating compositions may be blended with one or more dispersions, emulsions, suspensions, colloidal suspensions, and the like.

For example the inventive coating compositions may be blended with polyurethane dispersion, alkyd dispersion, epoxy dispersion, polyolefin dispersion, vinyl acetate emulsion, acrylic emulsion, vinyl acetate ethylene emulsion, and/or the like. The addition of the additional components, as described herein, may be achieved as part of the process for making the inventive coating composition or the additional components may be added, for example to the aqueous dispersions or solution mixtures comprising the inventive polyester composition.

Crosslinking Agent

The inventive coating compositions comprise at least one or more crosslinking agents to promote crosslinking and/or optionally one or more catalyst to increase the rate of crosslinking. Such catalysts are generally known, and the selection of suitable catalyst typically depends on the selection of the crosslinking agent and other factors such as conditions for such crosslinking. Such catalysts include, but are not limited to, depending on type of crosslinker—strong acids, weak acids or compounds containing metals, such as dodecyl benzene sulfonic acid, p-toluene sulfonic acid, di-nonylnaphtalene disulfonic acid, methane sulfonic acid, phosphoric acid or weak acids such as ammonium or phosphonium salts or tin, bismuth, zirconium or aluminum chelate compounds. Exemplary catalysts include, but are not limited to, NACURE™, K-Kure™ and K-Kat™, available from King Industries, CYCAT™ from Cytec Industries, and/or FASCAT™ from Arkema Inc. The inventive coating compositions comprise 0.5 to 50 percent by weight of one or more crosslinking agents, based on the total weight of the solid content of the dispersion. All individual values and subranges from 0.5 to 50 weight percent are included herein and disclosed herein; for example, the weight percent can be from a lower limit of 0.5, 1, 3, 5, 10. 15, or 20 weight percent to an upper limit of 10, 12, 15, 18, 20, 25, 30, 35, 40, 45, or 50 weight percent. For example, the inventive coating compositions may comprise from 1 to 18; or in the alternative, from 1 to 15; or in the alternative, from 1 to 12; or in the alternative, from 1 to 10; or in the alternative, from 1 to 20; or in the alternative, from 1 to 30; or in the alternative, from 1 to 40; or in the alternative, from 1 to 45; or in the alternative, from 1 to 50 percent by weight of one or more crosslinking agents, based on the total weight of the solid content of the inventive coating composition. In selected embodiments the crosslinking agent may, for example, be phenol-formaldehyde resins, amino-formaldehyde resins including, but not limited, to urea-formaldehyde resins, melamine formaldehyde resins, benzoguanamine formaldehyde resins, glycouril formaldehyde resins, anhydride resins, epoxy group containing resins such as epoxy resins, epoxy group containing polyester or acrylic resins and blocked or unblocked isocyanate resins, and combinations of two or more thereof, provided that the combinations of such crosslinkers is compatible.

Crosslinking agent may be a compound, which reacts with a reactive functional group contained in the inventive coating composition formulation; thereby facilitating their crosslinking. Such functional groups can be present the inventive polyester compositions as well as the stabilizing agents comprising a second polyester.

Crosslinkable functional groups in the cross-linking agent are groups capable of reacting with the reactive functional group of the inventive polyester compositions or the stabilizing agents comprising a second polyester. For example, a carbodiimide group, an oxazoline group, an isocyanate group, an epoxy group, a methylol group, an aldehyde group, an acid or an anhydride group, a hydroxy group, an aziridinyl group or a silane group can be used in a crosslinker.

A possibility of crosslinking acid functional groups in an inventive coating composition comprising an aqueous dispersion is by use of multivalent metal ions by reaction of the aforementioned acid groups with a multivalent metal ion containing substance, such as zinc oxide.

Carboxylic acids contained in a dispersion could also be crosslinked in reactions with multifunctional olefinic unsaturated substances under catalysis of a strong acid. Multifunctional carbonates could also react with carboxylic acids to give ester linkages with liberation of carbon dioxide.

In the alternative, crosslinking may be accomplished via free radical crosslinking, initiated by addition of peroxides or via radiation, e.g., electron beam.

With respect to crosslinkable functional groups, one or more may be present in a crosslinking agent. In the alternative, two or more crosslinkable functional groups may be present in a single molecule.

The cross-linking agent having the above described crosslinkable functional group may be solvent borne or a water-dispersed or waterdispersible or water-soluble substance. In one embodiment, exemplary crosslinking agents include, but are not limited to, an aqueous monomeric or polymeric substance, which contains two or more oxazoline groups, carbodiimide groups, epoxy groups, isocyanate groups, methylol groups etc. or several of these per molecule.

An exemplary oxazoline crosslinking agent is an aqueous polymer having two or more oxazoline groups in its molecules, substances can be obtained by polymerizing an oxazoline group-containing monomer and, as required, an ethylenic unsaturated monomer. Alternatively an oxazoline crosslinking agent can also be obtained by reaction between a nitrile group and an aminoethanol group, dehydration of a hydroxylalkylamide group and the like.

Crosslinking agents having two or more carbodiimide groups can be produced from diisocyanate compounds by a condensation reaction accompanied by decarboxylation reaction of a diisocyanate compound. Examples of the diisocyanate compound include, but are not limited to, 1,5-naphthylene diisocyanate, 4,4'-diphenylmethane diisocyanate, 4,4'-diphenyldimethylmethane diisocyanate, 1,4-phenylene diisocyanate, 2,4-tolylene diisocyanate, 2,6-tolylene diisocyanate, hexanemethylene diisocyanate, cyclohexane-1,4-diisocyanate, xylylene diisocyanate, isophorone diisocyanate, dicyclohexylmethane-4,4'-diisocyanate, methylcyclohexane diisocyanate, and tetramethylxylylene diisocyanate and the like. These compounds may also be used as mixtures.

Monofunctional isocyanates may be included to control the resin molecular chain length such as phenyl isocyanate, tolyl isocyanate, cyclohexylisocyanate, dimethylphenyl isocyanate, butylisocyanate, and naphthyl isocyanate are useful.

Diisocyanate substances may be partially reacted with aliphatic compounds, alicyclic compounds, or aromatic compounds having a hydroxyl group, an imino group, an amino group, a carboxyl group, a mercapto group, an epoxy group, and the like.

In the condensation reaction accompanied by decarboxylation of a diisocyanate compound, a carbodiimidization catalyst can be used. Usable as such a catalyst are, for example, phospholene oxides such as 1-phenyl-2-phospholene-1-oxide, 3-methyl-2-phospholene-1-oxide, 1-ethyl-2-phospholene-1-oxide, and 3-phospholene isomers thereof.

In order to convert a carbodiimide group-containing polymer into an aqueous polymer, a hydrophilic segment is provided in the molecular structure of the carbodiimide group-containing polymer. For example, an aqueous polymer containing a carbodiimide group can be obtained by providing a hydrophilic segment having a functional group which has reactivity with an isocyanate group. Usable as the hydrophilic segment are: quaternary ammonium salts of dialkylamino alkylamine (e.g., quaternary ammonium salts of 2-dimethylaminoethanol); quaternary salts of dialkylamino alkylamine (e.g., 3-dimethylamino-n-propylamine); alkyl sulfonic acid salts having at least one reactive hydroxyl group (e.g., sodiumhydroxypropanesulfonate); a mixture of polyethylene oxide or polyethylene oxide, whose terminal is capped with an alkoxy group, and a polypropylene oxide (e.g., polyethylene oxide whose terminal position is capped with a methoxygroup or an ethoxy group).

As an aqueous cross-linking agent containing an epoxy group, there are exemplified sorbitol polyglycidyl ether, glycerol triglycidyl ether, polyglycerol polyglycidylether trimethylolpropane triglycidyl ether, poly(ethyleneglycol) diglycidyl ether, poly(propyleneglycol) diglycidyl ether, phenol ethyleneoxide glycidyl ether, and lauryl alcohol ethyleneoxide glycidyl ether or the like. In addition to the above, mentioned as examples are: a water-soluble epoxy resin obtained by reacting a carboxy compound, which is obtained through a reaction between a polyoxyethylene polyol compound and an acid anhydride compound, and an epoxy resin having two or more epoxy groups in its molecules; and a self-emulsifiable epoxy resin composition obtained by mixing the water-soluble epoxy resin and the epoxy resin having two or more epoxy groups in its molecules. Such resins can be obtained for example under the tradenames of XZ 92533.00, XZ 92598.00 and XZ 92446.00 from The Dow Chemical Company, Midland, Mich. Examples of the anhydride compound include, but not particularly limited to, preferably aromatic anhydrides such as phthalic anhydride, trimellitic anhydride, and pyromellitic anhydride; and cyclic aliphatic anhydrides such as maleic anhydride, succinic anhydride, tetrahydrophthalic anhydride, methyl tetrahydrophthalic anhydride, methyl nadic anhydride, alkenyl succinic anhdyride, hexahydrophthalic anhydride, and methyl hexahydrophthalic anhydride. There is no limitation on the epoxy resin having two or more epoxy groups in its molecules, and all known epoxy resins with an epoxy functionality of greater or equal to two can be used. Examples are polyglycidyl ether obtained from epichlorohydrin and a polyhydric compound such as, phenol novolac, and cresol novolac bisphenol A, bisphenol F, bisphenol S, resorcinol, hydroquinone or catechol; alkylene oxide-added bisphenol A; polyalcohols such as polypropylene glycol, 1,6-hexanediol, trimethylol propane, glycerin, cyclohexanedimethanol; and polyglycidyl ester and polyglycidyl amine of polycarboxylic acids such as adipic acid, phthalic acid, dimer acid and the like.

Cross-linking agents containing an isocyanate group are, for example: polyisocyanate mainly containing at least one member selected from the group consisting of an isocyanurate group-containing polyisocyanate, an urethodione group-containing polyisocyanate, an urethodione group/isocyanurate group containing polyisocyanate, an urethane group containing polyisocyanate, an allophanate group containing polyisocyanate, a biuret group containing polyisocyanate, a carbodiimide group containing polyisocyanate, and an uretodione group containing polyisocyanate, each of which contains 1,6-hexamethylene diisocyanate and/or isophorone diisocyanate as a raw material; and a self-emulsifiable polyisocyanate obtained by reacting a hydrophilic surfactant having at least one active hydrogen group which can react with an isocyanate group or polyethylene ether alcohol containing at least three poly-ethylene oxide units with fatty acid ester in which the sum of the number of carbons of fatty acid and a hydroxyl containing compound as raw materials is 8 or more and which has at least one active hydrogen group which can react with an isocyanate group. In addition to the above, an urethane group-containing polyisocyanate obtained by reaction between 1,6-hexamethylenediisocyanate and/or an isophorone diisocyanate and an active hydrogen group-containing compound or polyisocyanate obtained by an allophanatization reaction, carbodiimidization reaction, uretodionization reaction, and biuretization reaction of these diisocyanate compounds can be mentioned.

Examples of suitable crosslinking agents containing an aldehyde are phenol formaldehyde resins, amino formaldehyde resins or combinations thereof.

Phenol formaldehyde crosslinking agents include, but are not limited to, reaction products of aldehydes with phenols. Preferred aldehdyes but not exclusive are formaldehyde and acetaldehyde. A large variety of phenols can be used such as but not exclusive phenol, cresol, p-phenylphenol, p-tert-butylphenol, p-tert-amylphenol, cyclopentylphenol, cresylic acid, bisphenol-A, bisphenol-F and the like and combinations thereof. Also acid functional phenols could be used in making phenol formaldehyde resins. The cross-linkers can be unetherified or etherified with alcohols or polyols. These phenol formaldehyde resins may be soluble in solvents or self-emulsifiable in water or can be stabilized by use of colloid stabilizers such as polyvinyl alcohol.

Amino formaldehyde crosslinking agents include, but are not limited to, reaction products of aldehydes with amino or amido group containing molecules. Exemplary aldehydes include, but are not limited to, formaldehyde and acetaldehyde. A large variety of amino or amido group containing molecules can be used such as but not exclusive urea, melamine, benzoguanamine, acetoguanamine, glycoluril and the like. Suitable amino crosslinking resins include melamine-formaldehyde, urea-formaldehyde, benzoguanamine-formaldehyde, acetoguanamine-formaldehyde, glycoluril-formaldehyde resins. Also the methylol groups of an amino formaldehyde resin can be partially or fully etherified with at least one of the groups of monohydric aliphatic alcohols such as methanol and/or n-butanol. These amino formaldehyde resins may be soluble in solvents or soluble or self-emulsifiable in water or can be stabilized by use of colloid stabilizers such as polyvinyl alcohol can be used to stabilize the amino formaldehyde dispersions.

Commercially available amino-formaldehyde resins which are water soluble or water dispersible and useful for the instant purpose include Cymel™ 301, Cymel™ 303, Cymel™ 370, and Cymel™ 373 (all being products of Cytec Surface Specialties, Brussels, Belgium). Other aldehydes used to react with the amino compound to form the resinous material are crotonic aldehyde, acrolein, or compounds which generate aldehydes, such as hexamethylene-tetramine, paraldehyde, and the like.

Another class of crosslinking agents for carboxylic acid groups in the inventive coating compositions comprising an aqueous dispersion are water-soluble hydroxyalkylamide crosslinkers such as Bis(N,N'-dihydroxyethyl) adipamide and the like. Such compounds are commercially available under the tradename of PRIMID™ crosslinker resins from EMS-PRIMID in Switzerland, for example PRIMID™ XL-522, PRIMID™ SF-4510 and PRIMID™ QM-1260

The one or more crosslinking agents may be added to the inventive coating compositions as part of the inventive coating composition formulation process; or in the alternative, the one or more crosslinking agents may be added to the aqueous dispersion or solution mixture comprising the inventive polyester composition as part of their formulation process.

The one or more crosslinking agents may be added to the solvent borne formulation at any stage of the formulation process.

In one embodiment, depending on the type of food or beverage which is to be contained in a coated container, and on required coating properties it may be beneficial to combine several crosslinkers or some crosslinkers may be more suited than others. Some crosslinkers may not be suited for all applications. Some crosslinkers may require the addition of catalysts for proper cure.

Crosslinkers will help to build thermoset networks, which is indicated by higher values of MEK Double Rubs compared to an identical formulation not containing the crosslinker.

Coating Applications and Forming Coated Containers or Closure Devices

The coating composition comprising the inventive polyester may be used on any suitable substrate including, but not limited to metal, wood, plastic, leather, glass, concrete, and the like. In one embodiment the coating compositions comprising the inventive polyester may be used to form a coating layer. The inventive coating compositions of the present invention may be used, for example, in container, e.g. can, coating application, or closure device coating application. Such coated container devices include, but are not limited to, cans such as beverage cans, food cans; aerosol containers such as those for non-food products, e.g. hair spray, hair dye, or color spray lacquers; drums; kegs; pails; decorative tins; open trays; tubes, bottles, monoblocs, and the like. The coated articles such as closure devices include, but are not limited to, caps, lids such as thin aluminum foil based lids for yogurt and butter containers, or crown corks; closures for glass jars and bottles such as roll-on closures, vacuum closures, pilfer-proof closures, easy peel lids for can closures, and easy open end or conventional ends for cans. Cans may be 2 piece cans or 3 piece cans. Beverage cans include, but are not limited to, beer cans, carbonated soft drink cans, energy drink cans, isotonic drink cans, water cans, juice cans, tea cans, coffee cans, milk cans, and the like. Food cans, include, but are not limited to, vegetable cans, fruit cans, meat cans, soup cans, ready meal cans, fish cans, edible oil cans, sauce cans and the like. Such cans may have any shapes; for example, such can may have a cylindrical shape, cubical, spherical, semi-spherical, bottle shape, elongated cubical shape, shallow or tall shape, round or rectangular shape or any other suitable shape. The coated articles such as container devices according to the instant invention may be formed via any conventional method. For example, the coated container device may be formed via stamping, drawing, redrawing, wall ironing, bending, beading, embossing, debossing, flanging, necking, stretching, blow-stretching and any other suitable conventional method. Such methods are generally known to those having ordinary skill in the art. The inventive coating compositions may, for example, be applied to a substrate, e.g. metal sheet or metal foil, and then the coated substrate may be formed into a coated container device or a coated closure device. In the alternative, a substrate may be formed into a container device or a closure device, and then the container device or the closure device is coated with one or more inventive coating composition to form the coated container device or coated closure device. The inventive coating compositions may be applied via any method; for example, via roller coating, spray coating, powder coating, dip coating, electrodeposition coating, printing, wash coating, flow coating, curtain coating.

The substrate comprises one or more metals including, but not limited to, aluminum and aluminum alloys, electrolytic tinplate cold rolled low carbon mild steel ("ETP"), electrolytic chromium/chromium oxide coated cold rolled low carbon mild steel (ECCS), and any other pre-treated steel, or one or more polymers such as one or more polyolefins, e.g. polyethylene and/or polypropylene. Pretreatment may include, but is not limited to, treatment with phosphoric acid, zirconium phosphate, chromium phosphate, and the like as well as silanes for reasons such as primary corrosion protection and improved adhesion. The substrate may comprise a sheet, strip or a coil. The substrate may comprise one or more layers, and each layer may have a thickness in the range of from 0.01 µm to 2 mm; for example, from 0.01 µm to 1.5 mm; or in the alternative, from 0.01 µm to 1 mm; or in the alternative, from 0.01 µm to 0.5 mm; or in the alternative, from 0.01 µm to 0.2 mm; or in the alternative, from 0.01 µm to 0.1 mm or in the alternative, from 0.01 µm to 100 µm; or in the alternative, from 0.01 µm to 50 µm; or in the alternative, from 1 µm to 50 µm; or in the alternative, from 1 µm to 15 µm. The substrate may be pre-coated with one or more pre-coating compositions. Such pre-coating compositions may optionally further include, but are not limited to, one or more resin binders, one or more resin crosslinkers, one or more solvents, one or more additives, and one or more pigments. Exemplary resin binders include, but are not limited to, epoxy, polyester, polyvinyl chloride containing organosols/vinyls, phenolic, alkyd, oleoresin, acrylic resin, and the like. Exemplary crosslinkers include, but are not limited to, phenol-formaldehyde resins; amino-formaldehyde resins including but not limited to urea-formaldehyde, melamine formaldehyde, benzoguanamine formaldehyde, anhydride resins, blocked isocyanate resins and epoxy groups containing resins, including but not limited to, epoxy resins, epoxy groups containing polyesters, acrylic resins, vinyl resins or the like. Exemplary solvents and thinners include, but are not limited to, glycol ethers, alcohols, aromatics, e.g. aromatic hydrocarbons, white spirit, branched ketones and esters. Exemplary additives include, but are not limited to, catalysts, lubricants, wetting agents, defoamers, flow agents, release agents, slip agents, anti-blocking agents, additives to mask sulfur staining, pigment wetting/dispersion agents, anti-settling agents, UV stabilizers, adhesion promoters. Pigments include, but are not limited to titanium dioxide, zinc oxide, aluminum oxide, zinc and aluminum. The substrate may also be pre-coated with one or more pre-coated laminate compositions. Such compositions may, for example, include polyethylene, polypropylene, or polyester compositions, and may be applied either as a film via film lamination process or melt-extrusion coating process onto the metal surface.

The coating inventive coating compositions are applied to the at least one surface of the substrate may be dried via any conventional drying method. Such conventional drying methods include but, are not limited to, air drying, convection oven drying, hot air drying, and/or infrared oven drying. During the drying process, crosslinking of one or more inventive polyester compositions, stabilizing agents, or combinations thereof, involving one or more the crosslinking agents, may occur. Additional cure might occur by radiation cure, e.g. electron-beam cure. The one or more inventive coating compositions are applied to the at least one surface of the substrate may be dried at any temperature; for example, it may be dried at a temperature in the range of equal or greater than the melting point temperature of the inventive polyester compositions; or in the alternative, it may be dried at a temperature in the range of less than the melting point of the stabilizing agent. The one or more inventive coating compositions are applied to the at least one surface of the substrate may be dried at a temperature in the range of about 60° F. (15.5° C.) to about 700° F. (371° C.) for a period of less than about 40 minutes, for example, less than 20 minutes, or less than 10 minutes, or less than 5 minutes, or less than 2 minutes, or less than 1 minute, or less than 20 seconds. All individual values and subranges from about 60° F. (15.5° C.) to about 700° F. (371° C.) are included herein and disclosed herein; for example, a temperature in the range of about 60° F. (15.5° C.) to about 500° F. (260° C.) for a period of less than about 40 minutes, for example, less than 20 minutes, or less than 10 minutes, or less than 5 minutes, or less than 2 minutes, or less than 1 minute, or in the alternative, a temperature in the range of about 60° F. (15.5° C.) to about 450° F. (232.2° C.) for a period of less than about 40 minutes, for example, less than 20 minutes, or less than 10 minutes, or less than 5 minutes, or less than 2 minutes, or less than 1 minute. The temperature of the one or more inventive coating compositions applied to the at least one surface of the substrate may be raised to a temperature in the range of equal or greater than the melting point temperature of the inventive polyester composition for a period of less than about 40 minutes. All individual values and subranges from less than about 40 minutes are included herein and disclosed herein; for example, the temperature may be raised to a temperature in the range of equal or greater than the melting point temperature of the inventive polyester composition for a period of less than about 20 minutes, or in the alternative, the temperature may be raised to a temperature in the range of equal or greater than the melting point temperature of the inventive polyester composition for a period of less than about 5 minutes, for example, for a period in the range of about 0.5 to 300 seconds. In another alternative, the temperature of the one or more inventive coating composition applied to the at least one surface of the substrate may be raised to a temperature in the range of less than the melting point temperature of the inventive polyester composition for a period of less than 40 minutes. All individual values and subranges from less than about 40 minutes are included herein and disclosed herein; for example, the temperature may be raised to a temperature in the range of less than the melting point temperature of the inventive polyester composition for a period of less than about 20 minutes, or in the alternative, for a period of less than about 5 minutes, or in another alternative for a period in the range of about 0.5 to 300 seconds.

The coated substrate may further be coated with one or more conventional coating compositions, or it may further be laminated to one or more other layers. Such conventional coating compositions are generally known to person of ordinary skill in the art, and they may include, but are not limited to, epoxy resin coating compositions, acrylate based coating compositions, and polyester based coating compositions. The lamination process is generally known, and exemplary lamination layers may include, but are not limited to, polyester laminates, polyolefin based laminates such as polypropylene laminates.

The one or more inventive coating compositions comprising the one or more inventive polyester compositions applied to at least one surface of a substrate, for example a pre-coated substrate, as one or more crosslinked coating layers may have a cross cut adhesion, before retort, rating of at least 3B; for example, 4B or 5B, measured according to ASTM-D 3359-08. one or more inventive coating compositions comprising the one or more inventive polyester compositions applied to at least one surface of a substrate as one or more crosslinked coating layers may have a wedge bend pass rating of at least 50 percent, for example, at least 70 percent, or in the alternative, at least 80 percent, or in the alternative, at least 90 percent, measured via a Gardner "COVERALL" Bend Tester IG 1125.

EXAMPLES

The following examples illustrate the present invention but are not intended to limit the scope of the invention.

Inventive Polyester 1

21.2 grams of 1,4-cyclohexanedimethanol, 26.0 grams of 1,3-cyclohexanedimethanol, 24.8 grams of 2,2,4,4-tetramethylcyclobutanediol, 3.6 grams of trimethylolethane, 49.9 grams of dimethyl terephthalate, xylene and catalyst (0.1 weight % each of dibutyltin oxide and monobutyltin oxide) were added to a round bottom flask. The contents were heated to approximately 200° C. using an oil bath with mixing under a gentle nitrogen sweep. The reactor was in the bath for approximately 19 hours, and then the bath temperature was increased to approximately 220° C. and maintained at that temperature for approximately 4 hours. The temperature was then lowered to approximately 200° C. and 42.8 grams of isophthalic acid was added and allowed to mix in for approximately 45 minutes. The temperature was then increased to approximately 220° C. and held there for approximately 6 hours, and then raised to approximately 240° C. for an approximately additional 3.5 hours. The temperature was then lowered to approximately 220° C. and a mild vacuum was applied (less than 3.5 mm Hg) to the reactor. The vacuum and temperature were held constant for approximately 2 hours. After that time the reactor was removed from the oil bath and allowed to cool to room temperature and the resulting polyester was isolated and its physical properties were determined. The polyester was then dissolved in a solvent blend (1:1 toluene/PM acetate, by weight) to produce a polyester solution at approximately 40 weight percent solids.

Inventive Polyester 2

The same procedure as the process for preparation of Inventive Polyester 1, but using the following monomer composition: 60.1 grams of dimethyl terephthalate, 51.6 grams of isophthalic acid, 19.5 grams of 1,4-cyclohexanedimethanol, 23.9 grams of 1,3-cyclohexanedimethanol, 43.4 grams of 2,2,4,4-tetramethylcyclobutanediol and 2.4 grams of trimethylolethane.

Inventive Polyester 3

The same procedure as the process for preparation of Inventive Polyester 1, but using the following monomer composition: 49.9 grams of dimethyl terephthalate, 42.8 grams of isophthalic acid, 16.2 grams of 1,4-cyclohexanedimethanol, 22.1 grams of 2-butyl-2-ethyl-1,3-propanediol, 36.0 grams of 2,2,4,4-tetramethylcyclobutanediol and 2.0 grams of trimethylolethane.

Comparative Polyester 1

Comparative polyester 1 is Dynapol L952, which is commercially available from Evonik.

Comparative Polyester 2

The same procedure as the process for preparation of Inventive Polyester 1, but using the following monomer composition: 100.0 grams of dimethyl terephthalate, 85.5 grams of isophthalic acid, 83.3 grams of neopentyl glycol (NPG) and 37.4 grams of 1,4-cyclohexanedimethanol.

Inventive Coating Formulations 1-9:

Inventive Coating Formulations 1-9 (ICF 1-9) were prepared according the formulation components reported in Table 1. ICF 1-9 included solvents, Inventive Polyesters 1 or 2 or 3, crosslinker and an acid catalyst (Nacure 5925). The crosslinkers were Cymel 303, Cymel 1123 and Phenodur VPR 1785, all commercially available from Cytec. Coatings were cured at 200° C. for 10 minutes, and tested for their properties. The coating properties are reported in Table 2. The inventive coatings prepared from Inventive Coating Formulations 1-9 (Examples 1-9) indicated the best balance of solvent (MEK) resistance, flexibility (wedge bend % pass) and retort lactic acid resistance.

TABLE 1

| Formulation | ICF-1 | ICF-2 | ICF-3 | ICF-4 | ICF-5 | ICF-6 | ICF-7 | ICF-8 | ICF-9 |
|---|---|---|---|---|---|---|---|---|---|
| Inventive Polyester 1 @ 40% solids | 12.5 | 12.5 | 12.5 | 0 | 0 | 0 | 0 | 0 | 0 |
| Inventive Polyester 2 @ 40% solids | 0 | 0 | 0 | 12.5 | 12.5 | 12.5 | 0 | 0 | 0 |
| Inventive Polyester 3 @ 40% solids | 0 | 0 | 0 | 0 | 0 | 0 | 12.5 | 12.5 | 12.5 |
| Cymel 303 | 2.15 | 0 | 0 | 2.15 | 0 | 0 | 2.15 | 0 | 0 |
| Cymel 1123 | 0 | 2.15 | 0 | 0 | 2.15 | 0 | 0 | 2.15 | 0 |
| Phenodur VPR1785 | 0 | 0 | 12.85 | 0 | 0 | 12.85 | 0 | 0 | 12.85 |
| Nacure 5925 | 0.035 | 0.035 | 0.035 | 0.035 | 0.035 | 0.035 | 0.035 | 0.035 | 0.035 |
| Solvent (PM Acetate) | 9.25 | 9.25 | 12.1 | 9.25 | 9.25 | 12.1 | 9.25 | 9.25 | 12.1 |

TABLE 2

| Polyester/ Formulation | Mn | Mw | Tg (° C.) | OH # | MEK (DR) | Wedge Bend (% Pass) | Dry Adhesion | Konig Hardness (sec) | Retort Lactic Acid (121° C./30 min) | | |
|---|---|---|---|---|---|---|---|---|---|---|---|
| | | | | | | | | | Appearance | Blush | Adhesion |
| Inventive Polyester 1 | 9600 | 136000 | 96 | 16 | — | — | — | — | — | — | — |
| ICF-1 (Example 1) | | | | | 200+ | 87 | 5B | 174 | Okay | 4 | 4B |
| ICF-2 (Example 2) | | | | | 200+ | 93 | 5B | 179 | Okay | 5 | 3B |
| ICF-3 (Example 3) | | | | | 200+ | 52 | 5B | 189 | Okay | 5 | 4B |
| Inventive Polyester 2 | 9300 | 45000 | 108 | 7 | — | — | — | — | — | — | — |
| ICF-4 (Example 4) | | | | | 200 | 80 | 5B | 204 | Okay | 5 | 5B |
| ICF-5 (Example 5) | | | | | 200 | 90 | 5B | 194 | Okay | 5 | 4B |
| ICF-6 (Example 6) | | | | | 95 | 53 | 4B | 221 | Okay | 5 | 4B |
| Inventive Polyester 3 | 9600 | 42000 | 92 | 9 | | | | | | | |
| ICF-7 (Example 7) | | | | | 200 | 84 | 5B | 208 | Okay | 4 | 5B |
| ICF-8 (Example 8) | | | | | 125 | 92 | 5B | 216 | Okay | 4 | 3B |
| ICF-9 (Example 9) | | | | | 100 | 40 | 5B | 219 | Okay | 5 | 5B |

Comparative Coating Formulations 1-4:

Comparative Coating Formulations 1-4 (CCF 1-4) were prepared according the formulation components reported in Table 3. CCF 1-4 included solvents, Comparative Polyesters 1 or 2, crosslinker and an acid catalyst (Nacure 5925). The crosslinkers were Cymel 303, Cymel 1123 and Phenodur VPR 1785, all commercially available from Cytec. Coatings were cured at 200° C. for 10 minutes, and tested for their properties. The coating properties are reported in Table 4. The Comparative Coating Formulations 1-4 (Comparative Examples 1-4) resulted in coatings with poor performance for one or more of these properties: solvent (MEK) resistance, flexibility (wedge bend % pass) and retort lactic acid resistance.

TABLE 3

|  | CCF-1 | CCF-2 | CCF-3 | CCF-4 |
|---|---|---|---|---|
| Comparative Polyester 1 @ 40% solids | 12.5 | 12.5 | 12.5 | 0 |
| Comparative Polyester 2 @ 40% solids | 0 | 0 | 0 | 12.5 |
| Cymel 303 | 2.15 | 0 | 0 | 0 |
| Cymel 1123 | 0 | 2.15 | 0 | 0 |
| Phenodur VPR1785 | 0 | 0 | 12.85 | 0 |
| Nacure 5925 | 0.035 | 0.035 | 0.035 | 0.035 |
| Solvent (PM Acetate) | 9.25 | 9.25 | 12.1 | 9.25 |

Cross Cut Adhesion after Retort

In addition to testing cross cut adhesion on the dry panels prior to water retort exposure, a cross-cut adhesion test is performed within a half hour of being removed from the autoclave and rated for adhesion as described in the cross cut adhesion section. The adhesion is rated in accordance with the scale given in Table A.

TABLE A

| Adhesion Rating Scale |
|---|
| 5B  The edges of the cuts are completely smooth; none of the squares of the lattice is detached. |
| 4B  Small flakes of the coating are detached at intersections; less than 5% of the area is affected. |
| 3B  Small flakes of the coating are detached along the edges and at intersections of cuts. The area affected is 5-15% of the lattice. |
| 2B  The coating has flaked along the edges and on parts of the squares. The area affected is 15-35% of the lattice. |
| 1B  The coating has flaked along the edges of cuts in large ribbons and whole squares have detached. The area affected is 35-65% of the lattice. |
| 0B  Flaking and detachment is worse than 1B |

Retort Resistance (Lactic Acid)

The coated panels were immersed in 2% lactic acid in individual pressurizable glass beakers that were contained in a secondary container tray, and placed into a Tuttnauer 10" dia×18" Deep Chamber Autoclave model 1 Z-TUT-EZ-10

TABLE 4

| Polyester/ Formulation | Mn | Mw | Tg (° C.) | OH # | MEK (DR) | Wedge Bend (% Pass) | Dry Adhesion | Konig Hardness (sec) | Retort Lactic Acid (121° C./30 min) Appearance | Blush | Adhesion |
|---|---|---|---|---|---|---|---|---|---|---|---|
| Comparative Polyester 1 | 15400 | 33500 | 72 | 10 | — | — | — | — | — | — | — |
| CCF-1 (Comp. Example 1) | | | | | 70 | 84 | 5B | 189 | Poor | 4 | 0B |
| CCF-2 (Comp. Example 2) | | | | | 200 | 100 | 5B | 183 | Okay | 5 | 0B |
| CCF-3 (Comp. Example 3) | | | | | 110 | 25 | 5B | 196 | Okay | 5 | 4B |
| Comparative Polyester 2 | 9300 | 18300 | 68 | 1 | — | — | — | — | — | — | — |
| CCF-4 (Comp. Example 4) | | | | | 15 | 11 | 5B | 202 | Okay | 2 | 0B |

Test Methods

Test methods include the following:

Cross-Cut Adhesion Before Retort (Dry Adhesion)

Cross-cut adhesion is measured according to ASTM-D 3359-02—Measuring adhesion by tape test, Method B—using a BYK 1.5 mm, 11 blade cross-cut tester. This method provides the procedure for assessing the adhesion of coating films to metallic substrates by applying and removing a Scotch #410 double sided tape over the cuts made in the film. Place the center of a piece of tape over the grid and in the area of the grid smooth into place by a finger. To ensure good contact with the film rub the tape firmly with a wooden tongue blade. Within 90±30 seconds of application, remove the tape by seizing the free end and rapidly (not jerked) pulling it off at as close to an angle of 180 degrees as possible. Inspect the grid area for removal of coating from the substrate or from a previous coating using the illuminated magnifier. Rate the adhesion in accordance with the scale in Table A.

where they were retorted at 121° C. for 30 minutes. The panels were removed, and dried. The coating appearance was then rated on a scale of 1-5 (5—best, 1—worst) as determined by blush (a whitish appearance of the coating) as shown in Table B.

TABLE B

| Coating Blush Resistance Scale |  |
|---|---|
| 5 | No Blush |
| 4 | Very Slight blush |
| 3 | Slight blush |
| 2 | Blush |
| 1 | Strong Blush |

MEK Double Rub

The round end of a 1.5 pound ball peen hammer was used to perform the MEK double rub test by applying a force of ~1000-2000 g to the coating. A 4"×4" square of cheesecloth was bound around the hammer end and soaked with methyl ethyl ketone (MEK). The hammer was brought into contact with the coating, and moved forth-and-back over a section measuring approximately 6"×1", wherein one movement forth-and-back over the whole coating is considered one double rub. Double rubs were performed at a rate of about one double rub per second. No additional pressure was applied onto the hammer. After every 25 double rubs, the tissue was re-soaked. The double rub step was repeated until the coating was rubbed off, i.e. at least a portion of the metal substrate was exposed (excluding the ½" end sections of the testing area). In the event that the double rub step reached 200 double rubs, the testing was terminated, and 200+ double rubs were reported as the final results.

Wedge Bend

Wedge bend was measured via Gardner "COVERALL" Bend Tester IG 1125. The apparatus used for this test consists of two parts to convert it to a bending machine. A steel rod (mandrel) is mounted at the front of the base. The coated test panel of 100 mm width was flexed over the 3 mm rod mandrel; thus, the coating appears on the outside of the bend. The flexed panel was inserted in the wedge mandrel. The impacter, i.e. a metal weight, was raised to 40 centimeters height, and then dropped. The impacter is retrieved on its first bounce, and secured. The cylindrical fold in the panel was squeezed into a conical shape. The edge of the coated panel was rubbed with a solution of copper sulfate (mixture of 10 grams of copper sulfate, 90 grams of water and 3 grams of sulfuric acid). Anywhere the coating had been cracked; dark spots appeared, indicating failure. The length of the intact area along the length of the wedge bend, which is 100 mm, was measured in millimeters and expressed as percent pass.

The present invention may be embodied in other forms without departing from the spirit and the essential attributes thereof, and, accordingly, reference should be made to the appended claims, rather than to the foregoing specification, as indicating the scope of the invention.

We claim:

1. A polyester composition comprising a polyester polymer comprising the reaction product of: one or more polyacids which comprise at least 50 weight percent one or more aromatic diacids based on the total weight of the one or more polyacids; and one or more polyols which comprise from 20 to 30 weight percent of 1,4-cyclohexanedimethanol based on the total weight of the one or more polyols and from 30 to 50 weight percent 2,2,4,4-tetramethylcyclobutanediol based on the total weight of the one or more polyols; wherein said polyester polymer has a glass transition temperature in the range of from 80 to 120° C., a number average molecular weight between 8,000 and 15,000, a hydroxyl number in the range of from 7 to 16 mgKOH/g.

2. A method for producing a polyester polymer of claim 1 comprising: selecting one or more polyacids comprising at least 50 percent by the combined weight of one or more aromatic diacids; selecting one or more polyols comprising from 20 to 30 weight percent of 1,4-cyclohexanedimethanol based on the total weight of the one or more polyols and from 30 to 50 weight percent 2,2,4,4-tetramethylcyclobutanediol based on the total weight of the one or more polyols; contacting said one or more polyacids and one or more polyols in the presence of heat; and thereby forming said polyester polymer.

3. A coating composition comprising the polyester composition of claim 1 and one or more crosslinking agents.

4. An aqueous dispersion comprising the polyester composition of claim 1.

5. A solution mixture comprising the polyester composition of claim 1 and one or more solvents.

6. A coating layer derived from the coating composition of claim 3.

7. A coated substrate comprising a substrate and the coating composition of claim 3 associated with at least one surface of said substrate.

* * * * *